(12) United States Patent
Verdun

(10) Patent No.: US 6,272,195 B1
(45) Date of Patent: Aug. 7, 2001

(54) METHOD AND APPARATUS FOR CORRECTING SIGNAL SKEW DIFFERENTIALS BETWEEN TWO INTERCONNECTED DEVICES

(75) Inventor: Gary J. Verdun, Belton, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 08/585,855

(22) Filed: Jan. 16, 1996

Related U.S. Application Data

(60) Provisional application No. 60/000,779, filed on Jun. 30, 1995.

(51) Int. Cl.[7] .............................. H04L 7/00; H04L 25/00; H04L 25/40
(52) U.S. Cl. ............................................. 375/371; 713/503
(58) Field of Search ................................. 375/354, 371, 375/377; 371/1; 395/558; 713/503; 714/700; 331/107 R, 108 B, 108 C, 117 R, 137, 140

(56) References Cited

U.S. PATENT DOCUMENTS

| 4,293,851 | * | 10/1981 | Beyl, Jr. | 340/384 E |
|---|---|---|---|---|
| 4,546,330 | * | 10/1985 | Okada . | |
| 5,313,501 | * | 5/1994 | Thacker | 375/371 |
| 5,373,535 | * | 12/1994 | Ellis et al. | 375/371 |
| 5,379,299 | * | 1/1995 | Schwartz | 375/371 |
| 5,398,262 | * | 3/1995 | Ahuja | 375/356 |
| 5,406,590 | * | 4/1995 | Miller et al. | 375/376 |
| 5,446,867 | * | 8/1995 | Young et al. | 395/550 |
| 5,509,038 | * | 4/1996 | Wicki | 375/371 |
| 5,517,532 | * | 5/1996 | Reymond | 375/354 |
| 5,561,692 | * | 10/1996 | Maitland et al. | 375/371 |
| 5,579,352 | * | 11/1996 | Llewellyn | 375/376 |
| 5,696,951 | * | 12/1997 | Miller | 395/558 |
| 5,828,870 | * | 10/1998 | Gunadisastra | 395/558 |
| 5,914,963 | * | 6/1999 | Basile | 371/1 |

\* cited by examiner

Primary Examiner—Chi Pham
Assistant Examiner—Jean B Corrielus
(74) Attorney, Agent, or Firm—Ronald O. Neerings; Wade James Brady, III; Frederick J. Telecky, Jr.

(57) ABSTRACT

A device and method for eliminating system clock skew in portable computer (15) units used with an expansion base (20) including an oscillator (175), resistors (225, 230) and capacitor (235) tuned to a predetermined propagation delay time to align the portable subsystem clock signals (180, 185, 190) with the expansion base clock signal (195) at the expansion base connector (25) and thus conform to clock skew tolerance specifications for the PCI interface signal standard.

21 Claims, 2 Drawing Sheets

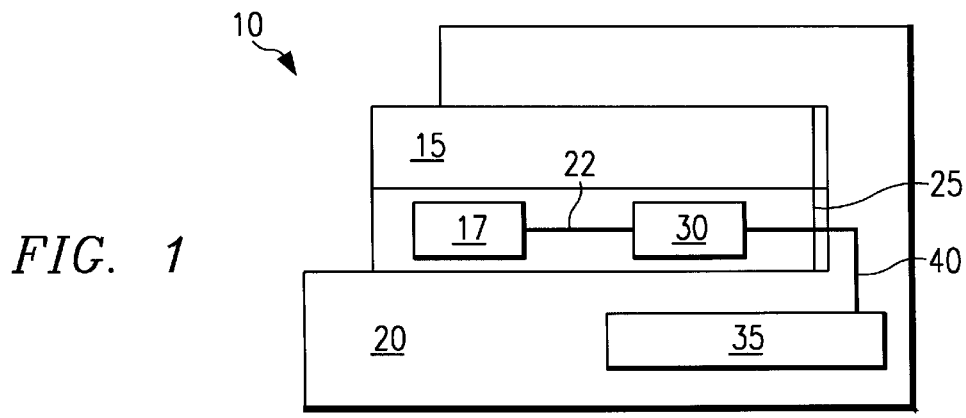
FIG. 1
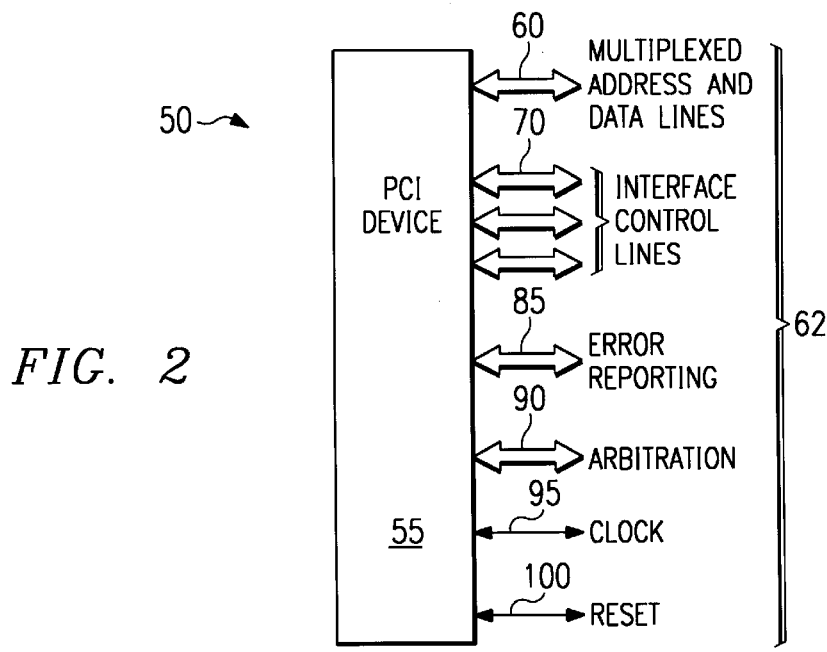
FIG. 2
FIG. 4
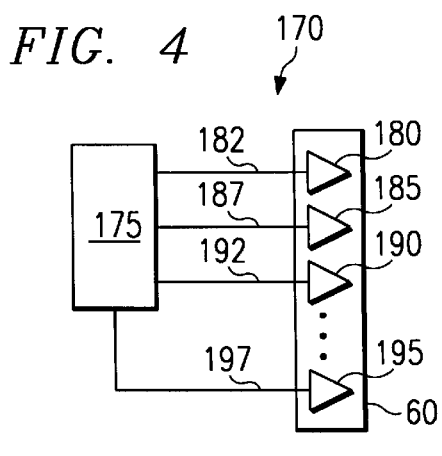
FIG. 5
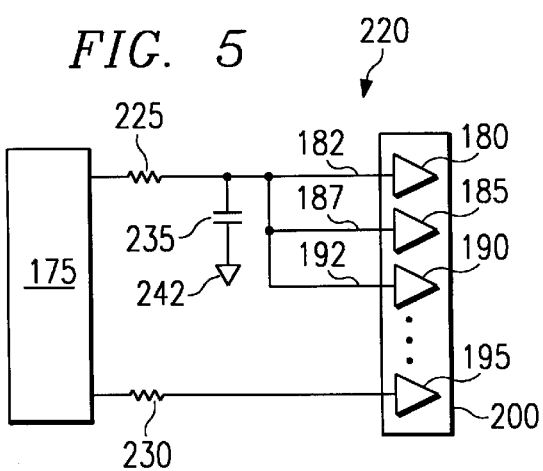

METHOD AND APPARATUS FOR CORRECTING SIGNAL SKEW DIFFERENTIALS BETWEEN TWO INTERCONNECTED DEVICES

This application claims priority under 35 USC § 119 (c)(1) of provisional application No. 60/000,779, filed Jun. 30, 1995.

TECHNICAL FIELD

The present invention relates in general to a method and apparatus of synchronizing signals at the system level interface and in particular to a device and method that compensates for signal propagation delays between portable computing devices and expansion units using the Peripheral Component Interface standard.

BACKGROUND OF THE INVENTION

Without limiting the scope of the invention, its background is described in connection with a portable computer system coupled to an expansion base unit housing one or more peripheral devices which are operably linked to the portable computer.

Standard bus architectures have been routinely employed as interfaces connecting the core microcomputer system to peripheral devices such as floppy disk drives, CD drives, printers, sound boards, tape backup systems, pointing devices and others for some time now. Popular examples of such bus architectures include the the Industry Standard Architecture (ISA), the Extended Industry Standard Architecture (EISA), the Micro Channel and NuBus. The introduction of advanced and higher speed computer systems, however, has created a need for an efficient high speed interface to communicate with peripheral devices. The response to this need was the development and adoption of the Peripheral Component Interface (PCI) standard.

A PCI bus is a synchronous, processor-independent 32-bit or 64-bit local bus that offers several key advantages over bus structures such a ISA and EISA. Compared to older architectures, PCI permits higher bus speeds (up to 33 Mhz), increased data transfer rates and independence from a particular processor or local bus arrangement.

Furthermore, PCI requires less printed circuit board (PCB) area compared to other bus implementations due to its relatively small pin count (49 pins for a Master PCI and 47 pins for a PCI target). Thus, it is common for computer manufacturers to offer one or more PCI slots on their desktop computers along side one or more ISA, EISA slots or other standard interface.

The use of the PCI architecture has been, until recently, primarily restricted to desktop computer systems. PCI use on portable systems such as laptops and notebook computers has been hindered for several reasons. First, portable systems have smaller PCB real estate limiting the size and quantity of circuitry. Second, since most portables operate on rechargeable batteries, any additional circuitry would drain available power, increase the frequency of battery recharge or replacement and divert power from other subsystems within the unit.

A popular addition to the portable computer system is commonly referred to as the expansion base or "docking" unit. In essence, a portable computer system is coupled to an expansion base via one or more physical connector(s) or via a single host bridge. The expansion base, in turn, houses one or more peripheral device such as a hard disk, sound card, video card and the like, which are driven by the portable computer's microprocessor.

SUMMARY OF THE INVENTION

The use of the PCI bus architecture on portable computer systems in conjunction with expansion base technology presents several difficulties. One such difficulty is conforming to the PCI defined standard of 2 ns ($2\times10^{-9}$) or less clock skew between any two devices on the bus. System clock skew is effected primarily by differences in wire lengths, capacitance, transit times and other system parameters relating to the physical layout on the system PCB.

While controlling the clock skew of devices within the larger desktop units is a relatively simple task, clock skew problems are a major concern for portable computer manufacturers looking to comply with the PCI clock skew tolerances. Limited PCB real estate, differences in system configurations, arrangement of PCB planes, signal routing paths, clock speeds and other factors specific to a given design are all critical factors effecting both the available design options and overall system clock skew.

Until the present invention, there was no practical cost effective means of compensating for differences in peripheral device clock skews without dedicating a critical area of the PCB or unnecessarily increasing component count.

Accordingly, it is one object of the present invention to provide a device for synchronizing clock signals at the physical interface level that brings peripheral clock signals out the portable PCI connector within the PCI clock skew specification. This is achieved by buffering the clock signals at the portable computer interface to cause a predetermined signal phase shift that aligns outgoing clock signals with a reference expansion bus clock signal.

Another object of the present invention is to provide a means of aligning signals that can be adjusted to compensate clock skew differences for a particular platform type or layout. The manufacturer computes clock skew differences either by theoretical or empirical techniques and components are then assembled at the portable unit's output and tuned to produce a desired amount of clock shift.

Yet another object of the present invention is to provide a cost effective means of compensating clock skews in a PCI based portable to expansion unit interface. Commonly available circuit components are arranged at the portable output stage in series with PCI device clock lines alleviating the need for special logic and/or large amounts of real estate. Power drain on system resources is kept to a bare minimum by implementing a passive circuit buffer array.

A device and method is disclosed for eliminating system clock skew between a portable computer unit and an expansion base using the PCI bus architecture as an interface. Included are an oscillator and an RC filter circuit tuned to a predetermined propagation delay time for aligning the portable subsystem clock signals with the expansion base clock signal at the expansion base connector. The device brings the overall clock skew for signals at the connector within clock skew tolerance specifications for the PCI bus architecture standard. Alternatively, a phase lead or lag relative to a reference clock signal may be obtained by using dedicated delay lines, or implemented in a semiconductor chip with programmable delay, or with other discrete or active components.

For a more complete understanding of the present invention, including its features and advantages, reference is now made to the following detailed description, taken in conjunction with the accompanying drawings.

BRIEF DESCRIPTION OF THE DRAWINGS

In the drawings:

FIG. 1 is a sketch diagram of a portable computer coupled to an expansion unit in accordance with the preferred embodiment of the invention;

FIG. 2 is a diagram of a basic PCI bus interface;

FIG. 4 is a diagram of a typical PCI drive circuit;

FIG. 5 is a diagram of the clock skew compensation circuit in accordance with the preferred embodiment of the invention.

Corresponding numerals and symbols in the different figures refer to corresponding parts unless otherwise indicated.

DETAILED DESCRIPTION OF THE PREFERRED EMBODIMENT

Figure 3:
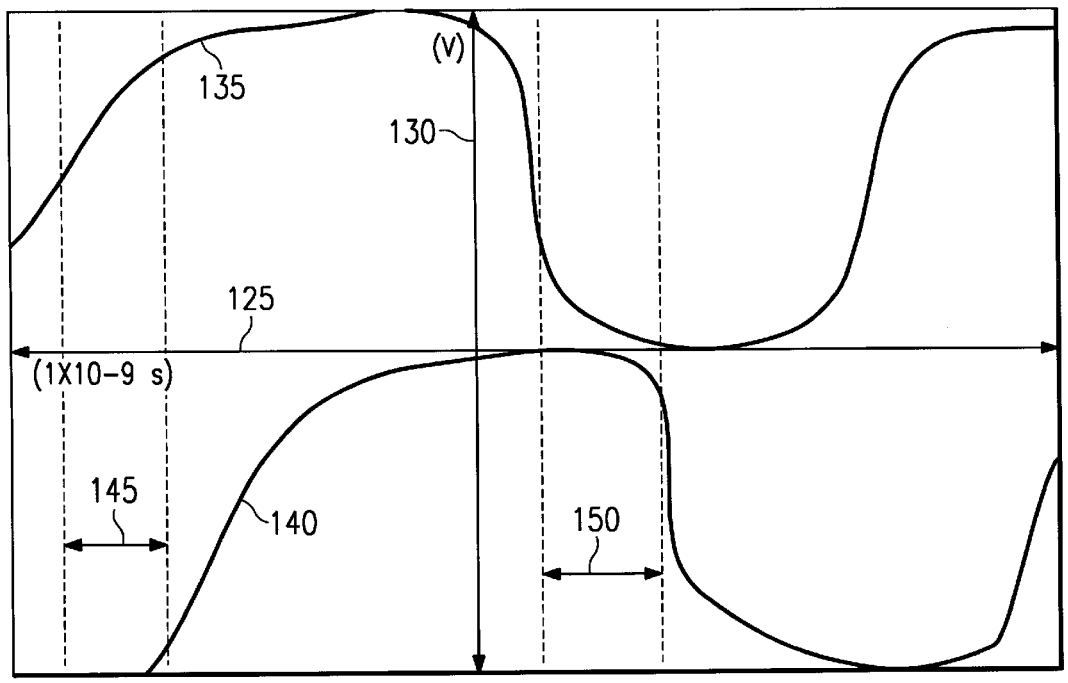
FIG. 3 is a illustrative sketch of clock skew between two clock pulses.

In reference to FIG. 1, a sketch 10 of a portable computer system 15 coupled to an expansion base 20 is shown. Expansion base 20 may comprise any one of the available docking stations on the market today having one or more expansion slots for holding peripheral devices such as hard disk drives, sound cards, display terminals, CD drives and other PCI compliant devices. It should be understood that the invention is equally suited to operate in other environments where clock skew alignment problems relating to the PCI bus architecture are involved.

As shown, a PCI compliant device 35 and PCI bus 40 are contained within expansion base 20. The PCI bus 40 provides an interface to PCI compliant devices 35 to processor 17 in portable computer 15 via host bridge 30 and local bus 22. Host bridge 30 provides a standard interface between any local bus 22 which processor 17 may access and PCI bus 40. Local bus 22 may be a proprietary architecture or a known standard or processor bus.

Processor 17 or local bus 22 may be replaced or updated and a new host bridge 30 added to maintain communications compatibility with PCI bus 40. In this way PCI bus 40 is independent of the particular processor 17 used.

The PCI interface specification is more readily understood by reference to FIG. 2 and denoted generally as 50. A PCI peripheral device 55 with input/output (I/O) lines 62 is depicted. As shown I/O lines 62 define the PCI bus 62 and include multiplexed address and data lines 60, interface control lines 70, error reporting lines 85, arbitration lines 90 as well as reset 100 and clock 95 lines.

In operation, a device (such as processor 17) on the portable 15 motherboard sends a bus request on interface control lines 70 (or arbitration lines 90 if a master PCI) to request use of the PCI bus lines 62. Clock line 95 provides device synchronization for the PCI device 55 along PCI bus 62 signals.

A clock 95 pulse transmitted from device 35 travels along circuit leads before reaching a device target. For example, a clock pulse from processor 17 (or other device) would travel a lead length before reaching the PCI complaint device 35. Accordingly, a clock 95 pulse experiences a propagation delay prior to reaching another device.

With reference to FIG. 3, an example of clock skew between any two devices is illustrated. A system clock signal 140 is traced along and bounded by axis 125 and 130. Axis 125 represents a time scale in nanoseconds while axis 130 represents amplitude in volts. System clock signal 140 may represent a pulse generated from hybrid 30 though an expansion base 20.

As shown, a device clock signal 135 as seen at the expansion base 20 connector 25 is out of phase with the system clock signal 140. The difference is represented by clock skew differentials 145 and 150. System errors occur when clock signal differentials 145 and 150 are greater than the PCI defined tolerance. Such errors may be reported on error reporting lines 85 causing system operation delay or system failure.

A typical PCI signal drive circuit is illustrated and depicted in FIG. 4 as 170. FIG. 4 shows that an oscillator 175 drives subsystem clocks 180, 185 and 190 via paths 182, 187 and 192, respectively. In the preferred embodiment, paths 182, 187 and 192 comprise individual system clock lines with different total impedances and capacitance corresponding the various devices in the portable unit 15 wishing to communicate on the PCI bus 40.

It should be understood that the specific characteristics of paths 182, 187 and 192 are effected by many aspects of the system layout including length, width, lead cluster and proximity as well as other factors.

Also shown in FIG. 4 expansion clock signal 195 is driven by oscillator 175 via lead 197. In the preferred embodiment, expansion clock signal 195 is the PCI synchronization signal between processor 17 (or other system devices addressing the PCI bus) leaving the PCI connector 25 from portable unit 15 for addressing and transmitting data to PCI complaint devices 35 within expansion base 20.

Likewise, lead 197 is a different length and has different impedance and capacitance qualities from leads 182, 187 or 192 causing different signal propagation delays.

Turning now to FIG. 5, an improved PCI expansion base drive circuit is shown and denoted as 220. Again oscillator 175 is the clock signal source and reference point for system clocks 180, 185 and 190 as well as expansion base clock 195 carried through connector 25. A first resistor 225 is connected serially to system clocks 180, 185 and 190. A second resistor 230 is in series with expansion base clock 195. In the preferred embodiment, resistors 225 and 230 comprise a matched set of 22 Ohms surface mount ceramic resistors, but other resistor types and values are within the scope of the invention.

A capacitor 235 is tied to system ground 242 and resistor 225 to form a delay proportional to the value of the overall capacitance buffering circuit formed by elements 225, 230 and 235. In this way, system clocks 180, 185, 190 are delayed a predetermined amount of time for alignment of the clock pulse signals with the expansion base connector 25.

In the preferred embodiment capacitor 235 is 43 picofarads in value but it should be understood that delay time may be adjusted by varying the values of resistors 225 and 230 as well as capacitor 235 to effect signal delay based on either theoretical or empirical calculation.

It should be understood by those skilled in the art that other implementations may be used to achieve a phase lead or lag relative to a reference clock signal and that such other implementations are within the true scope and spirit of the invention. Specifically, delay lines may be implemented on the physical system interface for phase shifting a desired signal a predetermined time differential. In another embodiment, a delay may be implemented in a semiconductor chip with memory means such as Random Access Memory (RAM), Non-Volatile Memory (NVRAM) or other storage means used to maintain a predetermined phase lead or lag coefficient. Other discrete or active components may be used to compensate system clock skews.

Figure 6:
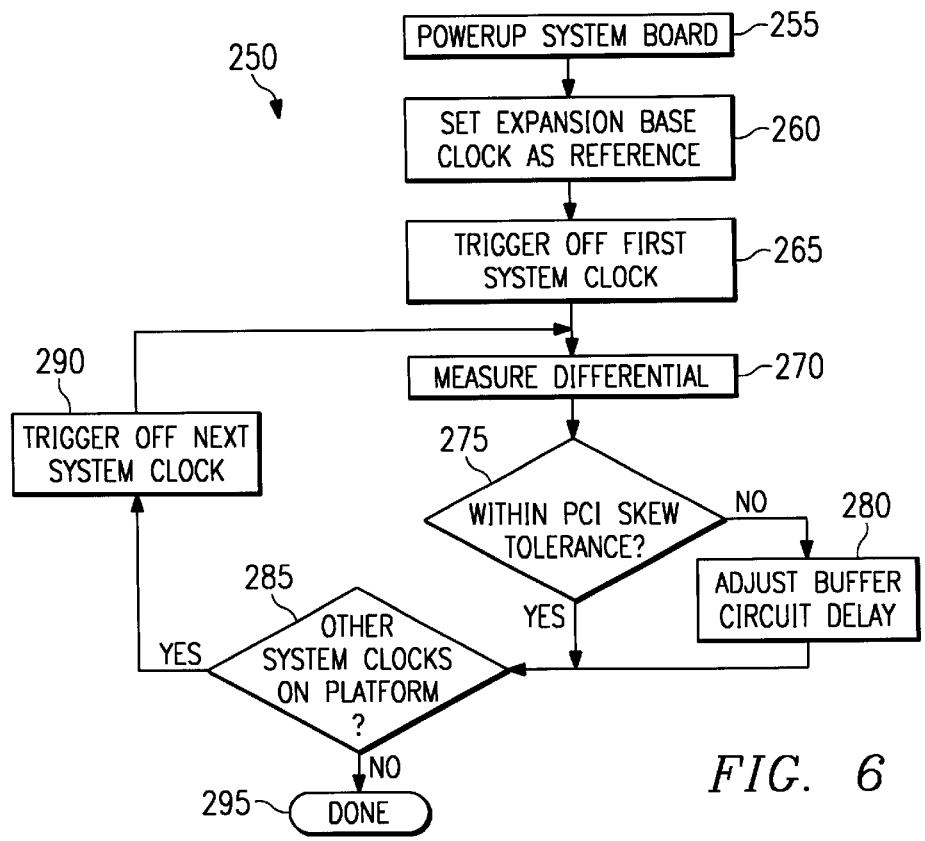
FIG. 6 is a process flow diagram illustrating the steps used to compensate clock skew differentials in accordance with the preferred embodiment of the invention.

The process of compensating for clock skew differentials in accordance with the preferred embodiment of the invention is demonstrated in FIG. 6. The process starts by applying power to the portable unit 15 system board 255 to activate device components and simulate operation. The expansion base clock signal from the PCI connector 25 is treated as the reference signal 260 for all other system signals out to the expansion base 20.

Process continues by applying a trigger to a first system clock signal 265 at the PCI connector 25 or other similar measuring point. The difference between the expansion bus signal and the system signal is measured 270 in an empirical way. It should be understood that the difference can be analytically derived from data books, spec sheets and other sources of information.

The difference measured 270 is compared to the PCI tolerance specification. For a system platform within tolerance, process flow continues to determining if another system clock 285 exists. For other systems clock signals coming out the connector 25, the process repeats itself 290 to measuring clock skew differentials 270 for each clock signal present.

Where the PCI skew tolerance is not met, process is directed to adjusting the delay circuit 280 to be placed at the connector 25 interface. Again, time delays are a function of output impedance and may be adjusted by increasing or decreasing the capacitance and impedance characteristics of the buffering circuit accordingly. Process terminates 290 when all system clocks are brought into alignment within the PCI tolerance specification.

A preferred embodiment has been described in detail hereinabove. It is to be understood that the scope of the invention also comprehends embodiments different from those described, yet within the scope of the claims.

"Processor" in some contexts is used to mean that a microprocessor is being used on the portable system board but may also mean that a memory block (RAM, cache, DRAM, flash memory and the like) coprocessor subsystem and the like is being used. The usage herein is that terms can also be synonymous and refer to equivalent things. The phrase "circuitry" comprehends ASIC (Application Specific Integrated Circuits), PAL (Programmable Array Logic), PLA (Programmable Logic Array), decoders, memories, non-software based processors, or other circuitry, or digital computers including microprocessors and microcomputers of any architecture, or combinations thereof. Word of inclusion are to be interpreted as nonexhaustive in considering the scope of the invention.

Internal and external connections can be ohmic, capacitive, direct or indirect, via intervening circuits or otherwise. Implementation is contemplated in discrete components or fully integrated circuits in silicon, gallium arsenide, or other electronic material families, as well as in optical-based or other technology-based forms and embodiments. It should be understood that various embodiments of the invention can employ or be embodied in hardware, software or micro coded firmware. Process diagrams are also representative of flow diagrams for micro coded and software based embodiments.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An apparatus, comprising:
    an oscillator in a computer for generating subsystem clock signals and an expansion base clock signal; and
    an RC filter circuit coupled to said oscillator, said RC filter circuit tuned to compensate for signal propagation delays between said subsystem clock signals and said expansion base clock signal by adding a predetermined phase lead to the subsystem clock signals relative to the expansion base clock signal.

2. The apparatus in accordance with claim 1 wherein the subsystem clock signals are a PCI defined clock pulse of a standard PCI bus architecture.

3. An apparatus, comprising:
    an oscillator in a computer for generating subsystem clock signals and an expansion base clock signal; and
    an RC filter circuit coupled to said oscillator, said RC filter circuit tuned to compensate for signal propagation delays between said subsystem clock signals and said expansion base clock signal by adding a predetermined phase lag to the subsystem clock signals relative to the expansion base clock signal.

4. The apparatus of claim 3, wherein the subsystem clock signals are a PCI defined clock pulse of a standard PCI bus architecture.

5. A device, comprising:
    an oscillator, the oscillator having first and second circuit leads;
    a first resistor, said first resistor serially connected at one lead to the first circuit lead of the oscillator;
    a second resistor, said second resistor serially connected at one lead to the second circuit lead of the oscillator; and
    a capacitor, said capacitor having a first lead connected to a second lead of the first resistor and a second lead connected to ground.

6. The device in accordance with claim 5 wherein the first resistor and second resistor each have a value of 22 ohms.

7. The device in accordance with claim 5 wherein the capacitor has a value of 43 picofarads.

8. The device in accordance with claim 5 wherein the said oscillator is a system clock of a portable computer system.

9. The device in accordance with claim 5 wherein the said oscillator is a circuit formed by the first resistor and said capacitor and said capacitor is approximately 2 nanoseconds.

10. A device, comprising:
    an oscillator, the oscillator having first and second circuit leads;
    a first resistor, said first resistor serially connected at one lead to the first circuit lead of the oscillator;
    a second resistor, said second resistor serially connected at one lead to the second circuit lead of the oscillator;
    a capacitor, said capacitor connected to a second lead of the first resistor;
    a connector, said connector comprising a plurality of pins; and
    a plurality of system clock leads, each lead having one end connected to said second lead of the first resistor and a second end connected to a pin on the said connector.

11. A device, comprising:

an oscillator, the oscillator having first and second circuit leads;

a first resistor, said first resistor serially connected at one lead to the first circuit lead of the oscillator;

a second resistor, said second resistor serially connected at one lead to the second circuit lead of the oscillator;

a capacitor, said capacitor connected to a second lead of the first resistor; and an expansion clock lead having a first end connected to the second end of the said second resistor and a second end connected to a pin on the a connector.

12. An apparatus, comprising:

an oscillator in a computer for generating subsystem clock signals and an expansion base clock signal, said oscillator having a first output for outputting said subsystem clock signals and a second output for outputting said expansion base clock signal; and an RC filter circuit coupled to said oscillator, said RC filter circuit tuned to compensate for signal propagation delays between said subsystem clock signals and said expansion base clock signal by adding a predetermined phase lead to the subsystem clock signals relative to the expansion base clock signal.

13. An apparatus, comprising:

an oscillator in a computer for generating subsystem clock signals and an expansion base clock signal, said oscillator having a first output for outputting a subsystem clock signals and a second output for outputting said expansion base clock signal and said RC filter circuit is coupled to said first output; and an RC filter circuit coupled to said oscillator, said RC filter circuit tuned to compensate for signal propagation delays between said subsystem clock signals and said expansion base clock signal by adding a predetermined phase lag to the subsystem clock signals relative to the expansion base clock signal.

14. An apparatus, comprising:

a computer coupled to an expansion base;

an oscillator in said computer for generating subsystem clock signals and an expansion base clock signal; and an RC filter circuit coupled to said oscillator, said RC filter circuit tuned to compensate for signal propagation delays between said subsystem clock signals and said expansion base clock signal by adding a predetermined phase lead to the subsystem clock signals relative to the expansion base clock signal.

15. An apparatus, comprising:

a computer coupled to an expansion base;

an oscillator in said computer for generating subsystem clock signals and an expansion base clock signal; and an RC filter circuit coupled to said oscillator, said RC filter circuit tuned to compensate for signal propagation delays between said subsystem clock signals and said expansion base clock signal by adding a predetermined phase lag to the subsystem clock signals relative to the expansion base clock signal.

16. An apparatus, comprising:

a computer coupled to an expansion base;

an oscillator in said computer for generating subsystem clock signals and an expansion base clock signal, said oscillator having a first output for outputting said subsystem clock signal and a second output for outputting said expansion base clock signal; and an RC filter circuit coupled to said oscillator, said RC filter circuit tuned to compensate for signal propagation delays between said subsystem clock signals and said expansion base clock signal by adding a predetermined phase lead to the portable computer clock signals relative to the expansion base clock signal.

17. An apparatus, comprising:

a computer coupled to an expansion base;

an oscillator in said computer for generating subsystem clock signals and an expansion base clock signal, said oscillator having a first output for outputting said subsystem clock signal and a second output for outputting said expansion base clock signal; and an RC filter circuit coupled to said oscillator, said RC filter circuit tuned to compensate for signal propagation delays between said subsystem clock signals and said expansion base clock signal by adding a predetermined phase lag to the portable computer clock signals relative to the expansion base clock signal.

18. An apparatus, comprising:

a computer coupled to an expansion base;

an oscillator in said computer, said oscillator having first and second circuit leads;

a first resistor, said first resistor serially connected at one lead to the first circuit lead of the oscillator;

a second resistor, said second resistor serially connected at one lead to the second circuit lead of the oscillator; and a capacitor, said capacitor connected to a second lead of the first resistor.

19. The apparatus of claim 18, wherein said oscillator is a system clock of the computer.

20. An apparatus, comprising:

a computer coupled to an expansion base;

an oscillator in said computer, said oscillator having first and second circuit leads;

a first resistor, said first resistor serially connected at one lead to the first circuit lead of the oscillator;

a second resistor, said second resistor serially connected at one lead to the second circuit lead of the oscillator;

a capacitor, said capacitor connected to a second lead of the first resistor;

a connector coupling said computer to said expansion base, said connector comprising a plurality of pins; and a plurality of system clock leads, each lead having a first end connected to the second end of said first resistor and a second end connected to a pin on said connector.

21. An apparatus, comprising:

a computer coupled to an expansion base;

an oscillator in said computer, said oscillator having first and second circuit leads;

a first resistor, said first resistor serially connected at one lead to the first circuit lead of the oscillator;

a second resistor, said second resistor serially connected at one lead to the second circuit lead of the oscillator;

a capacitor, said capacitor connected to a second lead of the first resistor; and an expansion clock lead having a first end connected to the second end of the second resistor and a second end connected to a pin on the connector.

* * * * *